(12) United States Patent
Turner et al.

(10) Patent No.: US 6,942,058 B2
(45) Date of Patent: Sep. 13, 2005

(54) VEHICLE STEERING SYSTEM FOR KICKBACK REDUCTION

(75) Inventors: Marcus Turner, Green Lane (GB); Ian Hulme, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 10/694,194

(22) Filed: Oct. 27, 2003

(65) Prior Publication Data

US 2005/0087388 A1 Apr. 28, 2005

(51) Int. Cl.$^7$ ............................................... B62D 5/04
(52) U.S. Cl. ...................................... 180/446; 701/41
(58) Field of Search ............................... 180/446, 443; 701/41, 42; 364/424.05

(56) References Cited

U.S. PATENT DOCUMENTS

| | | | |
|---|---|---|---|
| 5,470,994 A * | 11/1995 | Saeva et al. .................. 556/64 |
| 5,528,497 A * | 6/1996 | Yamamoto et al. ........... 701/41 |
| 5,703,775 A | 12/1997 | Yamamoto et al. |
| 5,767,642 A | 6/1998 | Furukawa |
| 5,774,819 A * | 6/1998 | Yamamoto et al. ........... 701/41 |
| 5,908,457 A | 6/1999 | Higashira et al. |
| 5,941,338 A | 8/1999 | Miller et al. |
| 5,953,978 A | 9/1999 | Bohner et al. |
| 6,018,691 A * | 1/2000 | Yamamoto et al. ........... 701/41 |
| 6,219,604 B1 | 4/2001 | Dilger et al. |
| 6,547,031 B1 * | 4/2003 | Magnus ...................... 180/444 |
| 6,637,543 B2 * | 10/2003 | Card .......................... 180/446 |
| 6,757,601 B1 * | 6/2004 | Yao et al. ..................... 701/41 |

* cited by examiner

Primary Examiner—Tony Winner
(74) Attorney, Agent, or Firm—Frank A. MacKenzie; Price, Heneveld, Cooper, DeWitt & Litton, LLP

(57) ABSTRACT

A steering system (10) and a method of dampening the forces transmitted to a steering wheel (20) of a vehicle when a steerable wheel (22) of the vehicle collides with an obstacle using the steering system (10). The method includes steering a vehicle via a steering wheel (20) operably connected to a steerable wheel (22), with the steering wheel (20) defining an input angle. The method also includes monitoring the rate of change of a steering angle (40) as defined by the steerable wheel (22), with the ratio of the input angle to the steering angle (40) defining a steering ratio. The method further includes reducing an amount of torque transmitted to the steering wheel (20) from the steerable wheel (22) when the rate of change of the steering angle (40) exceeds a maximum rate by adjusting the steering ratio (40).

13 Claims, 3 Drawing Sheets

STEERING WHEEL ANGLE FOR
GIVEN WHEEL BUMP POSITION

VEHICLE STEERING SYSTEM FOR KICKBACK REDUCTION

BACKGROUND OF THE INVENTION

The present invention relates to a vehicle steering system, and in particular to a steering system that reduces the kickback transmitted to a steering wheel from a steerable wheel when the steerable wheel encounters an obstacle.

Vehicle steering systems typically include a steering wheel coupled to at least one steerable wheel via a plurality of mechanical linkages and mechanisms. These linkages and mechanisms allow for the transfer of an input from the operator via the steering wheel, to be transmitted to the steerable wheel, as well as the transfer of forces from the steerable wheel to the steering wheel. Heretofore, the steering wheel systems that allow the transfer of forces from the steerable wheel to the steering wheel required the operator to exert significant force onto the associated steering wheel to counter forces transferred thereto. In situations of extreme driving, the steerable wheels of a vehicle may collide or strike obstacles causing the steering wheel to rotate violently overcoming the operators ability to hold the steering wheel, resulting in injury to the operator or loss of control of the vehicle.

SUMMARY OF THE INVENTION

A steering system for a motor vehicle includes a steering shaft having a first portion and a second portion, wherein the first portion of the steering shaft is adapted to receive an input from an operator, and a rotational coupler connecting the first portion of the steering shaft to the second portion of the steering shaft, wherein the rotational coupler allows the first portion of the steering shaft to rotate independently of the second portion of the steering shaft when a rotational torque that exceeds a maximum torque value is exerted on the second portion of the steering shaft. The steering system also includes at least one wheel that pivots to define a steering angle, wherein the steering angle is determined, at least in part, by the input to the steering shaft by the operator, and wherein the first portion of the steering shaft and the steering angle have a given original alignment therebetween. The steering system further includes a motor operatively connected to the wheel, wherein the steering angle is determined, at least in part, by an input from the motor, and a controller operatively connected to the motor and adjusting the input of the motor to the steering angle, and realigning the steering angle with the first portion of the steering shaft to the original alignment therebetween subsequent to a torque that exceeds the maximum torque value being exerted on the second portion of the steering shaft to rotate independently of the first portion of the steering shaft.

Another aspect of the present invention is to provide a steering system for a motor vehicle that includes a steering shaft adapted to receive an input from an operator, and at least one wheel that pivots to define a steering angle, wherein the steering angle is determined, at least in part, by the input to the steering shaft by the operator, and wherein the steering shaft and the steering angle have a given original alignment therebetween. The steering system also includes at least one sensor for sensing the exertion of a force on a component on the steering system that exceeds a maximum set value, a motor operatively connected to the wheel, wherein the steering angle is defined, at least in part, by an input from the motor, and an actuator operatively connected to the motor and in operable communication with the sensor, wherein the actuator reduces the amount of the force exerted on the component as transmitted to the steering wheel by allowing a misalignment of the steering shaft and the steering angle.

Yet another aspect of the present invention is to provide a method of dampening the forces transmitted to a steering wheel of a vehicle when a steerable wheel of the vehicle collides with an obstacle, that includes steering a vehicle via a steering wheel operably connected to a steerable wheel, wherein the steering wheel defines an input angle, and monitoring the rate of change of a steering angle as defined by the steerable wheel, wherein the ratio of the input angle to the steering angle defines a steering ratio. The method also includes reducing an amount of torque transmitted to the steering wheel from the steerable wheel by adjusting the steering ratio when the rate of change of the steering angle exceeds a maximum rate.

The present inventive vehicle steering system results in a significant reduction in kickback as transmitted from a steerable wheel to the steering wheel of a vehicle. The steering system described herein reduces the possibility of injury to the operator, while simultaneously allowing the operator to maintain control of the associated vehicle, and is particularly well adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
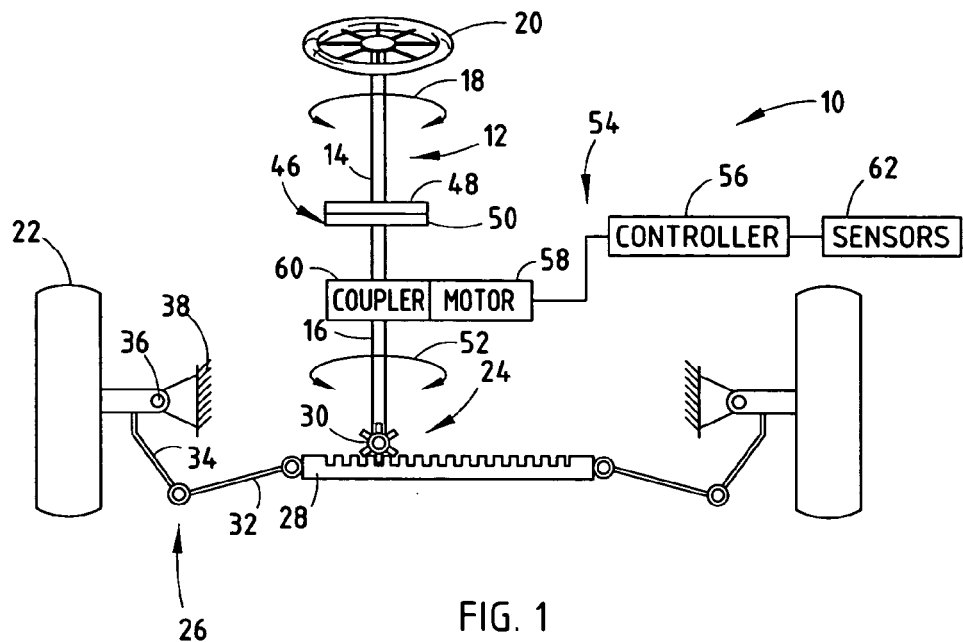
FIG. 1 is a partially schematic view of the steering system embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a vehicle steering system embodying the present invention. Steering system 10 includes a steering shaft 12 having a first portion 14 and a second portion 16. First portion 14 of steering shaft 12 is adapted to receive a rotational input in a direction and represented by an arrow 18 via a steering wheel 20 coupled therewith. Second portion 16 of steering shaft 12 is operably coupled to a pair of steerable front wheels 22 via a rack-and-pinion system 24 and a plurality of steering links 26. Rack-and-pinion system 24 includes a rack 28 and a pinion gear 30. Steering links 26 include drag links 32 and steering arms 34. Although the present example utilizes a rack-and-pinion steering system, it should be noted that other steering systems compatible with the inventive steering system 10 described herein may be substituted therefore.

Figure 2:
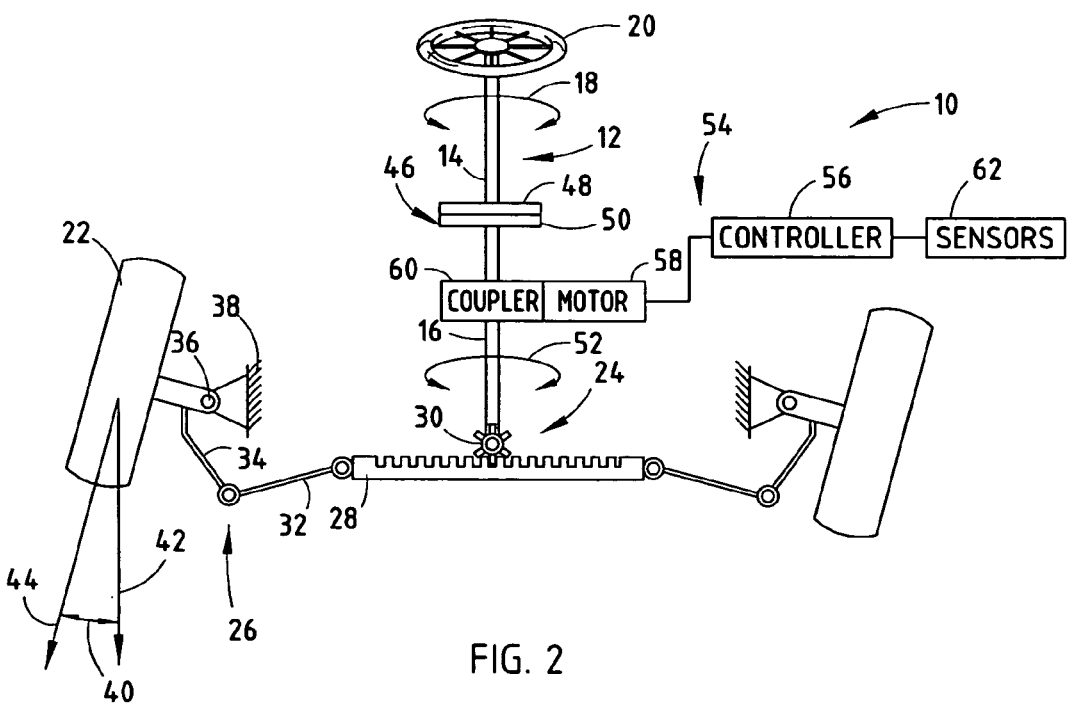
FIG. 2 is a perspective view of the steering system, wherein a steerable wheel defines a steering angle greater than 0°.

Each steerable wheel 22 (FIG. 2) pivots about a pivot point 36 with respect to a vehicle frame 38. Each wheel 22 defines a steering angle 40 between the longitudinal axis 42 of the associated vehicle and a central travel axis 44 of wheel 22. It should be noted that while steering angle 40 is defined by the pivotable movement of each of front wheels 22, a steering angle may be defined by pivotable rear wheels if the vehicle is so equipped, and/or any other pivotable wheels.

The steering system 10 further includes a clutch system 46 operable connecting first portion 14 with second portion 16 of steering shaft 12. Clutch system 46 includes a first clutch plate 48 and an abutting second clutch plate 50 having a frictional coefficient therebetween. Clutch system 46 allows first portion 14 of steering shaft 12 to rotate independently of second portion 16 of steering shaft 12 when a rotational torque in a direction and represented by a directional arrow 52 that exceeds a maximum torque value, or the frictional coefficient between first clutch plate 48 and second clutch plate 50, is exerted on second portion 16 of steering shaft 12. By allowing first portion 14 to rotate independently of second portion 16 of steering shaft 12 under prescribed conditions, the amount of torque transmitted to steering wheel 20 is reduced as described below.

Figure 3:
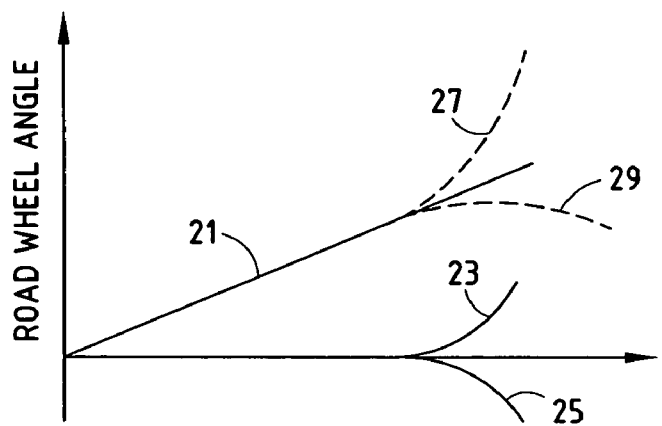
FIG. 3 is a diagram of steering angle versus steering wheel angle for the present inventive system.

The steering system 10 further includes an active front steering system 54 that includes a controller 56 in operable communication with a steering assist motor 58 operably connected to second portion 16 of steering shaft 12 via a mechanical coupler 60. The active front steering system 54 assists in pivoting wheels 22 depending on various driving parameters. Although a particular kind of basic steering system is illustrated in the examples herein, other systems known in the art may be utilized. In basic operation, active front steering system 54 augments the input from the operator as applied to steering wheel 20, via motor 58. As illustrated in FIG. 3, the steering angle 40 as defined by wheel 22 follows a particular ratio along line 21. Active front steering system 54 augments the input from the operator, thereby adjusting steering angle 40 by increasing the steering angle, as illustrated by line 23, or by decreasing the steering angle, as illustrated by line 25. Lines 27 and 29 represent the combined effects of line 21 with lines 23 and 25, respectively, and indicate the total input into steering angle 40.

In operation, a plurality of sensors 62 are utilized to monitor the alignment between steering wheel 20 and wheels 22, and therefore the alignment between steering wheel 20 and steering angle 40. As a result of the high return efficiency of rack-and-pinion steering systems, injuries may occur when a high torque is transmitted to the steering wheel from a front wheel, or steerable wheel, that collides with an obstacle. To eliminate a high torque from being transmitted to steering wheel 20 when wheels 22 collide with an object, clutch 12 allows first portion 14 of steering shaft 12 to rotate separately from second portion 16 of steering shaft 12 if a sufficient force is exerted on second portion 16, thereby overcoming the frictional coefficient between first clutch plate 48 and second clutch plate 50. Allowing first portion 14 and second portion 16 of steering shaft 12 to rotate separately causes a misalignment from the original alignment between steering wheel 20 and steering angle 40. Preferably, at least one sensor is in operable communication with a controller that monitors the application of a torque being applied to the first portion 14 of the steering shaft 12 and allows for disengagement of the clutch system 46 and locking the rotation of the first portion 14 of the steering shaft 12 with the second portion 16 of the steering shaft 12 when the vehicle is not running to thereby prevent misalignment when a driver of the vehicle grabs the steering wheel 20 and torques the steering wheel 20 as the driver enters the passenger compartment of the vehicle. Alternatively, at least one sensor can measure the speed of the vehicle and lock the rotation of the first portion 14 of the steering shaft 12 with the rotation of the second portion 16 of the steering shaft 12 when the vehicle is not moving to prevent misalignment as the driver enters the vehicle. In the alternative situation, a sensor can monitor to position of the driver's door to only lock rotation of the first portion 14 with the second portion 16 when the driver's door is open and when the velocity of the vehicle is zero.

To compensate for this misalignment the active front steering system 54 augments the input from the operator via steering assist motor 58 and returns wheels 22 and the associated steering angle 40 to the original alignment with first portion 14 of steering shaft 12 and steering wheel 20 over a finite period of time. The amount of time required to return steering angle 40 to the original alignment with first portion 14 of steering shaft 12 and steering wheel 20 depends on parameters such as the amount of misalignment therebetween, current road conditions, braking conditions, speed of the vehicle, etc. However, in some situations, the first portion 14 and the second portion 16 of the steering shaft 12 do not have to be realigned. Typically, no realignment is necessary when other systems of the vehicle are not hampered by misalignment.

Figure 4:
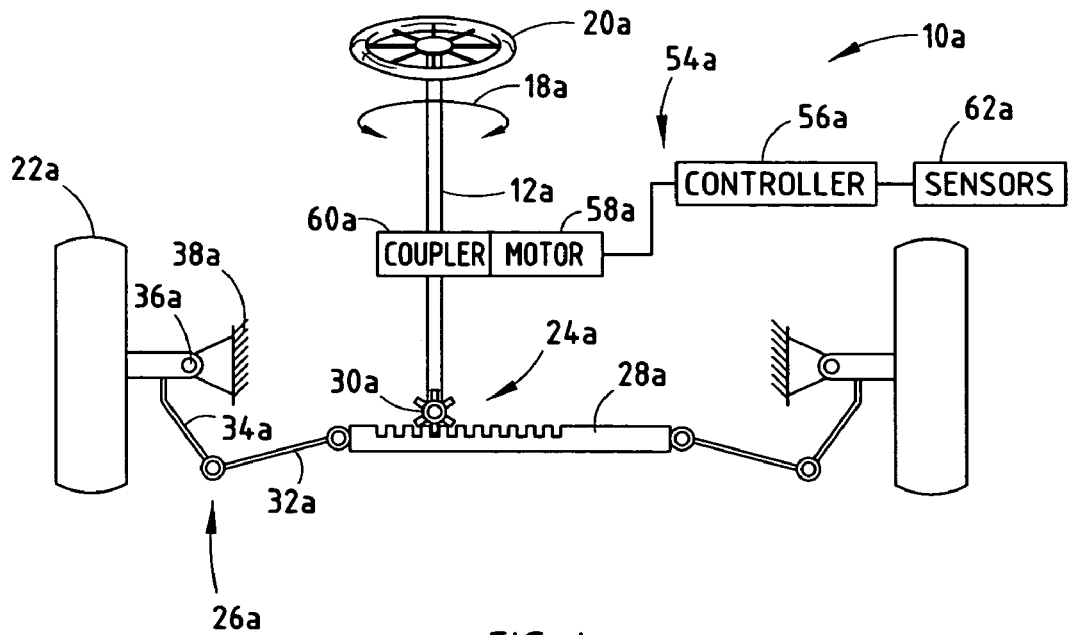
FIG. 4 is a partially schematic view of an alternative embodiment of the steering system.
Figure 5:
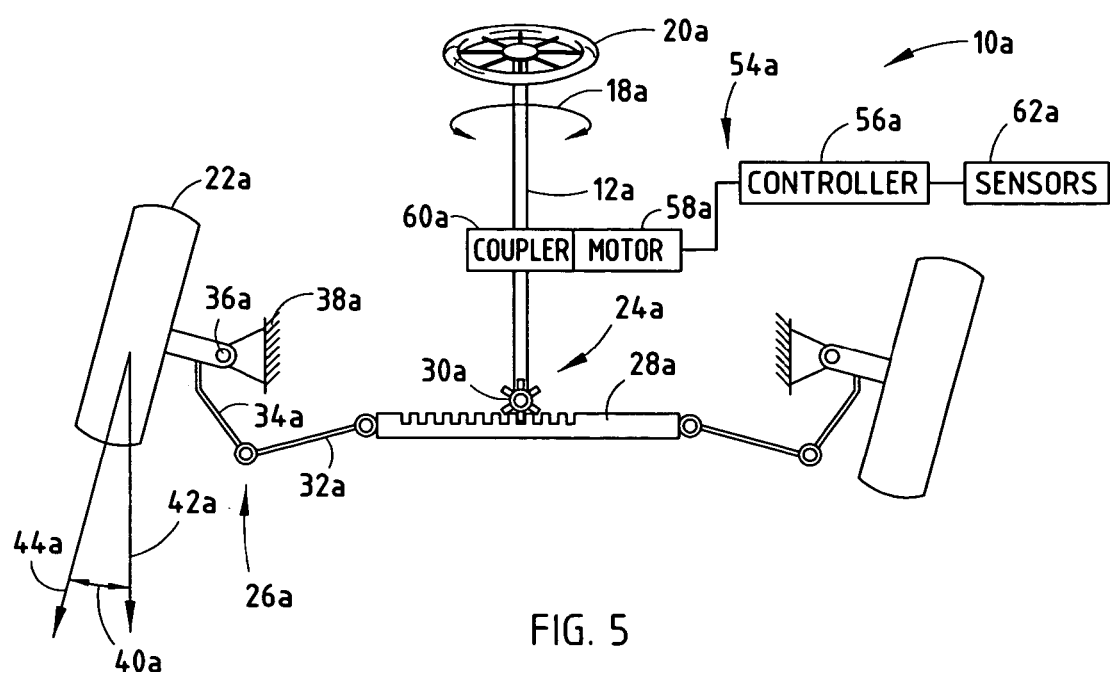
FIG. 5 is a partially schematic view of the alternative embodiment of the steering system, wherein the steerable wheel defines a steering angle greater than 0°.

The reference numeral 10a (FIG. 4) generally designates another embodiment of the steering system of the present invention. Since steering system 10a is similar to the previously described steering system 10, similar parts appearing in FIGS. 1 and 2 and FIGS. 3 and 4 respectively are represented by the same, corresponding reference numeral, except for the suffix "a" in the numerals of the latter. Steering system 10a operates similarly to steering system 10, with the main exception being that any misalignment between steering wheel 20a and steering angle 40a from the original alignment is compensated directly by active front steering system 54a rather than a clutch system.

In operation, the striking of an obstacle by wheels 22a is monitored by sensors 52a. Sensors 62a may be adapted to monitor the rate of change of steering angle 40a, and/or a strain upon any of the components of steering system 10a, including steering links 26a, rack-and-pinion system 24a, etc. This information is then relayed to controller 56a which compensates for and reduces the amount of the force exerted on wheels 22a as transmitted to steering shaft 12a and steering wheel 20a, by controlling steering assist motor 58a accordingly. It should be noted that the active front steering system 54a and the components thereof of the present example are utilized herein for basic illustrative purposes only and that numerous active front steering systems are known in the art and may be utilized in conjunction with the present invention steering system 10a.

The present inventive vehicle steering system results in a significant reduction in kickback as transmitted from a steerable wheel to the steering wheel of a vehicle. The steering system described herein reduces the possibility of injury to the operator, while simultaneously allowing the operator to maintain control of the associated vehicle, and is particularly well adapted for the proposed use.

In the foregoing description it will be readily appreciated by those skilled in the art that modifications may be made to the invention without departing from the concepts disclosed herein. For example, the force between the first clutch plate 48 and the second clutch plate 50 can preferably be altered, either continuously or discretely, to thereby provide the clutch system 46 with more than one setting, depending on the friction between the plates 48 and 50 set by the force between the plates 48 and 50. Such modifications are to be considered as included in the following claims, unless these claims by their language expressly state otherwise.

The invention claimed is:

1. A steering system for a motor vehicle, comprising:
   a steering shaft adapted to receive an input from an operator;
   at least one wheel that pivots to define a steering angle, the steering angle being determined, at least in part, by the input to the steering shaft by the operator, the steering shaft and the steering angle having a given original alignment therebetween;
   at least one sensor for sensing the exertion of a force on a component of the steering system that exceeds a maximum set value;
   a motor operatively connected to the wheel, the steering angle being defined, at least in part, by an input from the motor; and
   an actuator operatively connected to the motor and in operable communication with the sensor, wherein the actuator reduces the amount of the force exerted on the component as transmitted to the steering shaft by allowing a misalignment of the steering shaft and the steering angle.

2. The steering system of claim 1, wherein:
   the actuator realigns the steering shaft and the steering angle to the original alignment over a finite period of time.

3. The steering system of claim 2, further including:
   at least one sensor in operable communication with the actuator that monitors the alignment between the steering shaft and the steering angle.

4. The steering system of claim 3, further including:
   at least one sensor in operable communication with the actuator that monitors the application of a torque being applied the steering shaft.

5. The steering system of claim 3, further including:
   at least one sensor in operable communication with the actuator and that monitors the velocity of the vehicle, wherein the actuator prevents a misalignment between the steering shaft and the steering angle when the velocity of the vehicle is zero.

6. The steering system of claim 1, further including:
   at least one sensor in operable communication with the actuator that monitors the alignment between the steering shaft and the steering angle.

7. The steering system of claim 1, further including:
   at least one sensor in operable communication with the actuator that monitors the application of a torque being applied to the steering shaft, and wherein the actuator prevents a misalignment between the steering shaft and the steering angle when the vehicle is parked.

8. The steering system of claim 1, further including:
   at least one sensor in operable communication with the actuator and that monitors the velocity of the vehicle, wherein the actuator prevents a misalignment between the steering shaft and the steering angle when the velocity of the vehicle is zero.

9. The steering system of claim 1, wherein:
   the sensor for sensing the exertion of a force to the wheel senses the stress exerted on a component of the steering system.

10. The steering system of claim 1, wherein:
    the component of the vehicle includes a steering link.

11. A method of dampening the forces transmitted to a steering wheel of a vehicle when a steerable wheel of the vehicle collides with an obstacle, comprising the steps of:
    steering a vehicle via a steering wheel operably connected to a steerable wheel, the steering wheel defining an input angle;
    monitoring the rate of change of a steering angle as defined by the steerable wheel, the ratio of the input angle to the steering angle defining a steering ratio; and
    reducing an amount of torque transmitted to the steering wheel from the steerable wheel when the rate of change of the steering angle exceeds a maximum rate by adjusting the steering ratio.

12. The method of claim 11, further including:
    monitoring the original alignment between the steering wheel and the steerable wheel; and
    realigning the steering wheel with the steerable wheel to the original alignment over a finite period of time via an active steering actuator.

13. The method of claim 12, wherein:
    the step of monitoring the rate of change of the steering angle includes monitoring the stress exerted on a component in a vehicle steering system.

* * * * *